(12) United States Patent
Chiu (10) Patent No.: US 7,504,582 B1
(45) Date of Patent: Mar. 17, 2009

(54) RETAINING JOINT FOR FIXING CABLE

(76) Inventor: Teh-Tsung Chiu, 235 Chung-Ho, Box 8-24, Taipei (TW)

( * ) Notice: Subject to any disclaimer, the term of this patent is extended or adjusted under 35 U.S.C. 154(b) by 0 days.

(21) Appl. No.: 11/107,718

(22) Filed: Apr. 18, 2005

(51) Int. Cl.
*H02G 3/06* (2006.01)

(52) U.S. Cl. ............... 174/65 R; 174/65 G; 174/65 SS; 439/583; 285/322

(58) Field of Classification Search ............... 174/65 R, 174/65 SS, 74 R, 35 R, 35 C, 65 G, 75 C, 174/102 R, 74 A, 75 F, 77 R; 439/578, 583, 439/584, 95, 96, 271, 607, 98, 609, 610; 285/140.1, 322; 248/56
See application file for complete search history.

(56) References Cited

U.S. PATENT DOCUMENTS

| | | | | | |
|---|---|---|---|---|---|
| 2,856,451 | A | * | 10/1958 | Appleton | .................. 174/77 R |
| 4,250,348 | A | * | 2/1981 | Kitagawa | ................ 174/65 SS |
| 4,600,803 | A | * | 7/1986 | Holzmann | .............. 174/65 SS |
| 4,767,135 | A | * | 8/1988 | Holzmann | ................... 285/322 |
| 5,378,027 | A | * | 1/1995 | Gehring | ....................... 285/322 |
| 5,927,892 | A | * | 7/1999 | Teh-Tsung | ................... 285/322 |
| 6,019,615 | A | * | 2/2000 | Masuda | .................... 174/65 SS |
| 6,042,396 | A | * | 3/2000 | Endo et al. | ................ 174/65 R |
| 6,162,995 | A | * | 12/2000 | Bachle et al. | ............. 174/65 R |
| 6,511,099 | B2 | * | 1/2003 | Bartholoma et al. | ...... 174/65 R |

* cited by examiner

*Primary Examiner*—Angel R. Estrada (57) ABSTRACT

A retaining joint for fixing a cable includes a joint unit having a hollow body; the hollow body having a resisting ring; a front side and a rear side of the resisting ring having a first combining portion and a second combining portion, respectively; the first combining portion serving for combining with a locking unit; a front end of another second combining portion being connected to a plurality of clamping sheets; a tightening element having a through hole; an inner surface of the tightening element having a thread for combining with the second combining portion; an inner wall of the tightening element being protruded as an extrusion surface for clamping and compress the clamping sheets to clamp the protection tube; and a protection tube being a hollow body; a surface of the protection tube being formed with a plurality of protruding rings and a plurality of recesses.

3 Claims, 9 Drawing Sheets

RETAINING JOINT FOR FIXING CABLE

FIELD OF THE INVENTION

The present invention relates to joints, and particularly to a retaining joint for fixing a cable, wherein the retaining joint of the present invention can firmly secure a cable fixed therein so as to have the effect of water-proof, dust-proof and insect-proof. The cable is firmly secured to the joint even an external force is applied therein.

BACKGROUND OF THE INVENTION

In one prior art about the retaining joint for fixing a cable, a protection tube is a soft tube with an annular structure. A joint has a body and a lock. An O-ring is installed within the body. The lock of the joint is firstly engaged to an outer surface of the protection tube and then a distal end of the protection tube is buckled with a confining structure. Then the body of the joint is locked with the lock and the confining structure is tightly engaged so as to form an integral body. The confining structure is a hollow annular body and an end thereof is formed with a guide angle. A plurality of confining sheets are formed on an annular surface of the confining structure. An inner surface of each confining sheet is formed with a hook for being buckled to an annular recess of the protection tube. A top end of the confining structure is formed with an inclined protruding portion which is compressed by an annular surface of the body so that the protection tube, confining structure and joint are combined as an integral body.

However in practical use, only several points of the confining structure are in contact with the recess of the protection tube. Furthermore, gaps are formed between the confining sheets and the inner wall of the body for providing a deforming space to the confining sheets. The confining sheets clamp the protection tube by the elasticity itself. Thus, the protection tube is not completely clamped. Therefore, when an external force is applied to the protection tube, the confining sheets cannot clamp the protection tube completely to make the protection tube to release. Thus the cable within the protection tube cannot be protected well. Thus the prior art cannot provide complete water-proof, insect-proof and dust-proof effects to the clamped cable.

SUMMARY OF THE INVENTION

Accordingly, the primary object of the present invention is to provide a retaining joint for fixing a cable, wherein the retaining joint of the present invention can firmly secure a cable fixed therein so as to have the effect of water-proof, dust-proof and insect-proof. The cable is firmly secured to the joint even an external force is applied therein.

To achieve above object, the present invention provides a retaining joint for fixing a cable. The retaining joint comprises a joint unit having a hollow body; the hollow body having a resisting ring; a front side and a rear side of the resisting ring having a first combining portion and a second combining portion, respectively; the first combining portion serving for combining with a locking unit; a front end of another second combining portion being connected to a plurality of clamping sheets; a tightening element having a through hole; an inner surface of the tightening element having a thread for combining with the second combining portion; an inner wall of the tightening element being protruded as an extrusion surface for clamping and compress the clamping sheets to clamp the protection tube; and a protection tube being a hollow body; a surface of the protection tube being formed with a plurality of protruding rings and a plurality of recesses.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
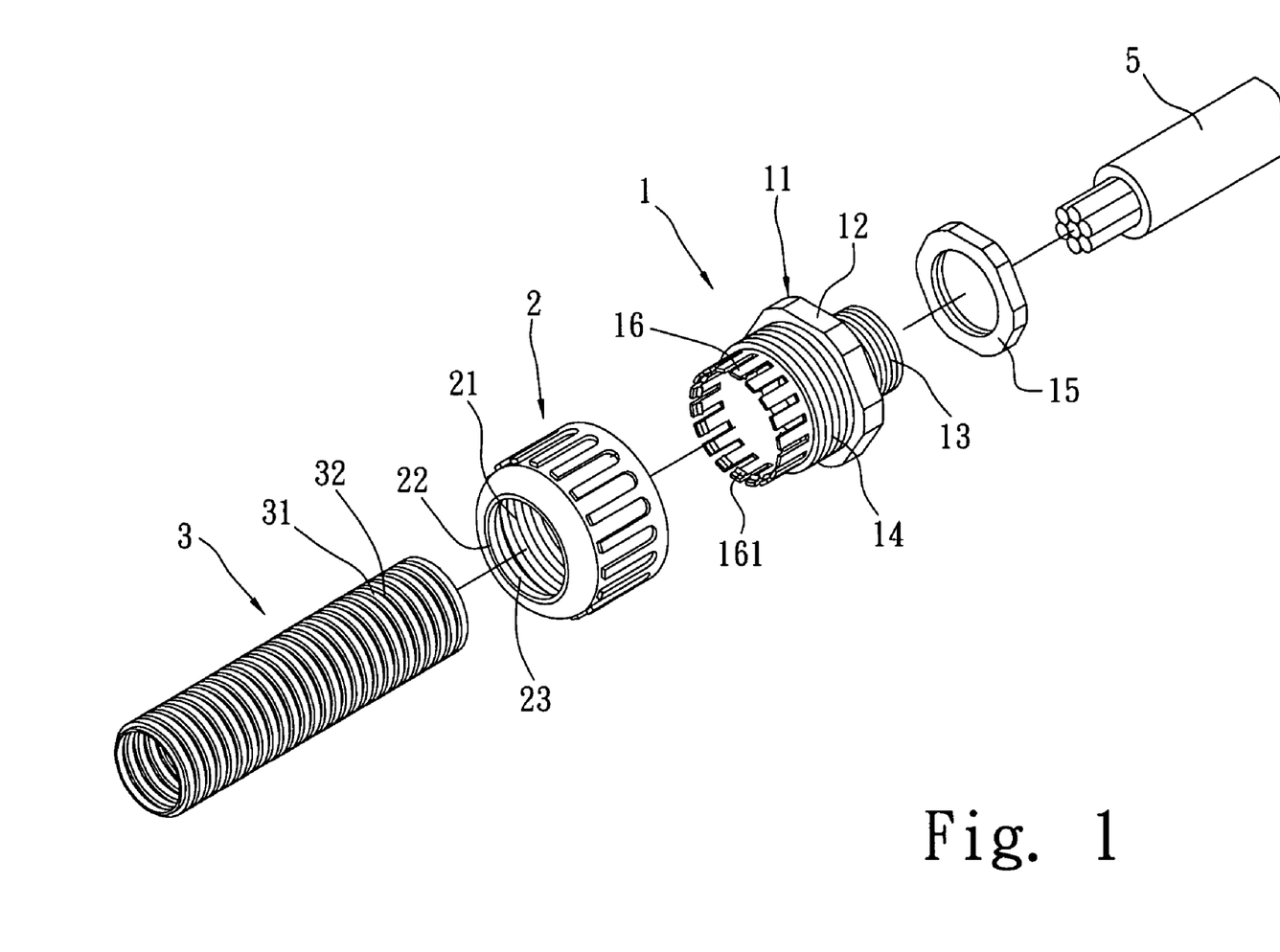
FIG. 1 is an exploded schematic view about the protection tube, joint unit and cable according to the present invention.
Figure 2:
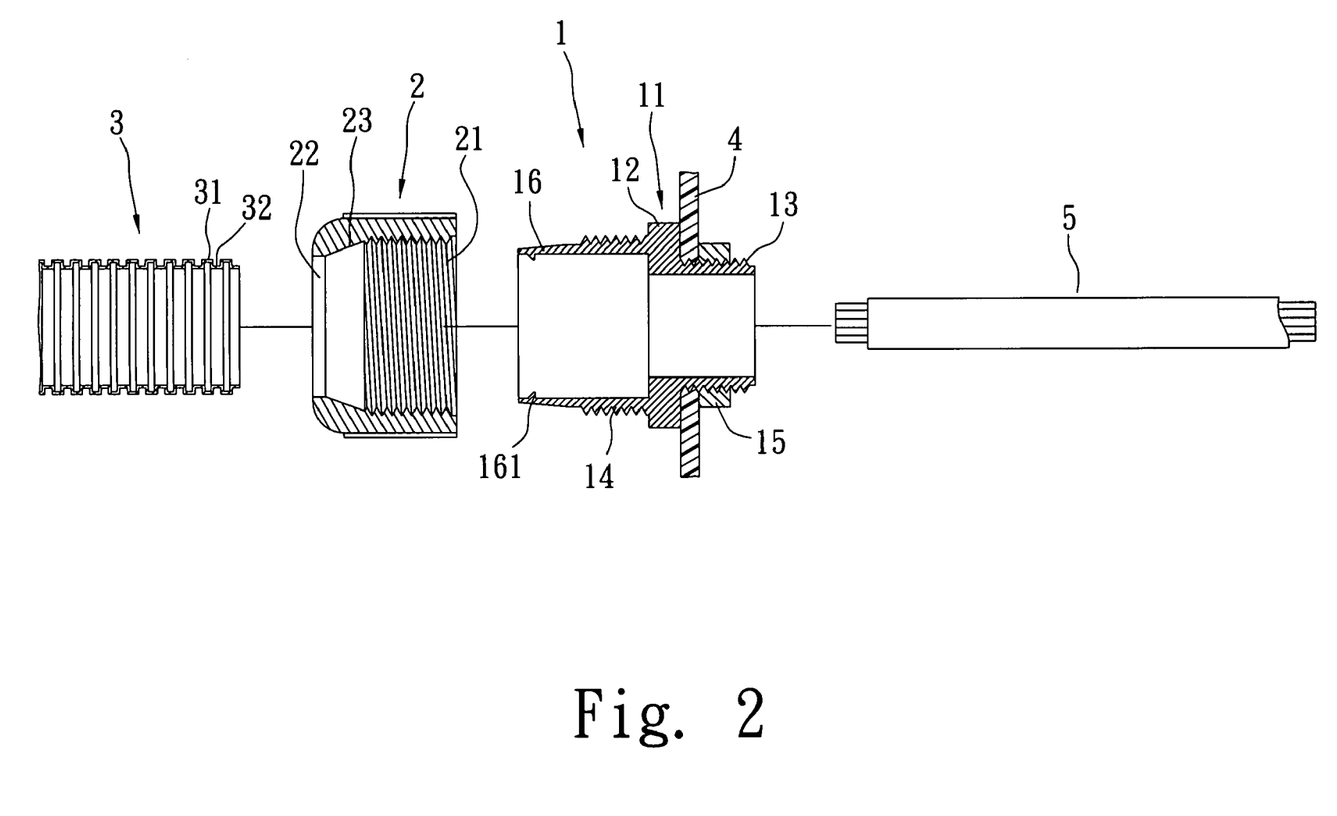
FIG. 2 is a schematic cross view of FIG. 1.

With reference to FIGS. 1 and 2, the structure of the present invention is illustrated. The retaining joint for fixing a cable of the present invention comprise a joint unit 1, a tightening element 2 assembled to the joint unit 1, and a protection tube 3 assembled to the joint unit 1 and the tightening element 2.

A joint unit 1 has a hollow body 11. The hollow body 11 has a resisting ring 12. A front side and a rear side of the resisting ring 12 have respective combining portions 13, 14 respectively. The first combining portion 13 serves to be combined with a locking unit 15. When a first combining portion 13 is screwed with a retaining means 4, the locking unit 15 serves to screw with the first combining portion 13. Thus the joint unit 1 is locked to the retaining means 4. Besides a front end of another second combining portion 14 is connected to a plurality of elastic clamping sheets 16. Each clamping sheet 16 has a reduced thin portion 161.

A tightening element 2 has a through hole 21. An inner surface of the tightening element 2 has thread 22 for combining with the second combining portion 14. An inner wall of the tightening element 2 is protruded as an extrusion surface 23 for clamping and compress the clamping sheets 16 to clamp the protection tube 3.

A protection tube 3 is a hollow body. A surface of the protection tube 3 is formed with a plurality of protruding rings 31 and a plurality of recesses 32 for retaining the protection tube 3. When the clamping sheets 16 are compressed by the resisting ring 12, the reduced thin portion 161 of the clamping sheet 16 will be buckled into one annular recess 32 of the protection tube 3.

Figure 3:
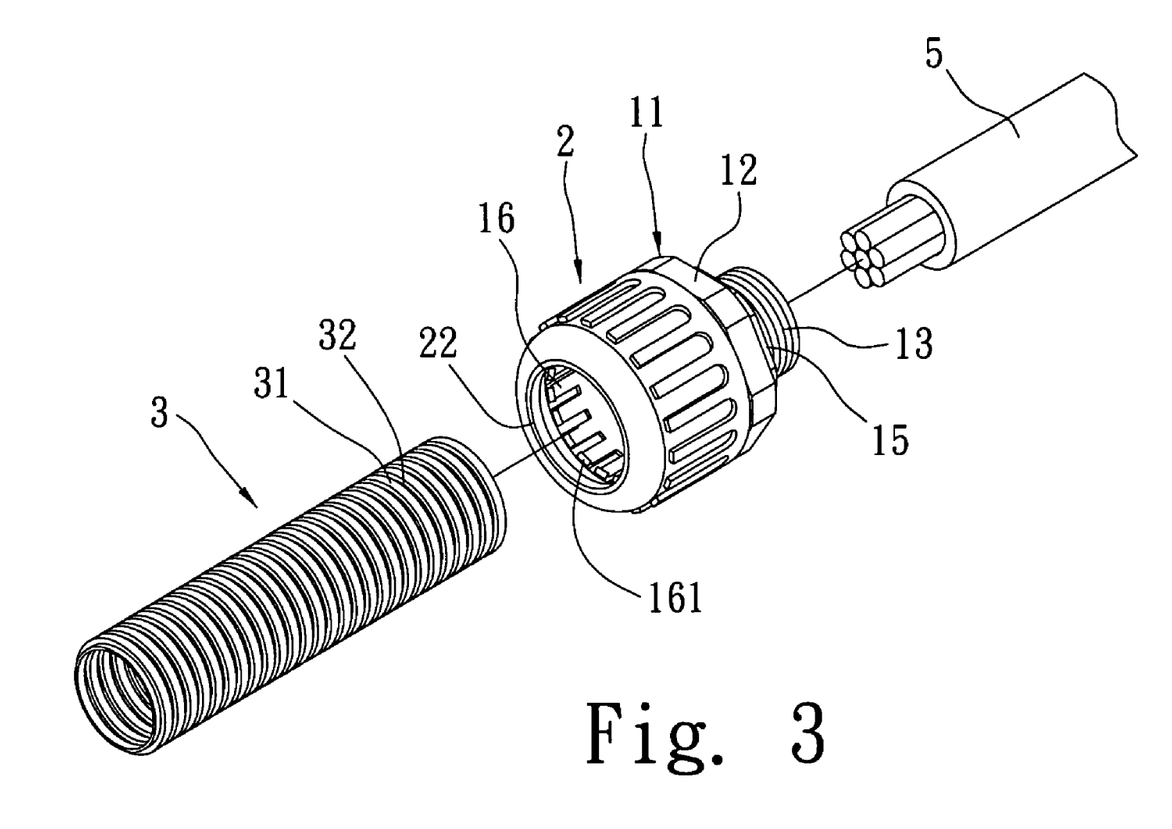
FIG. 3 is an assembled schematic view of FIG. 1.
Figure 4:
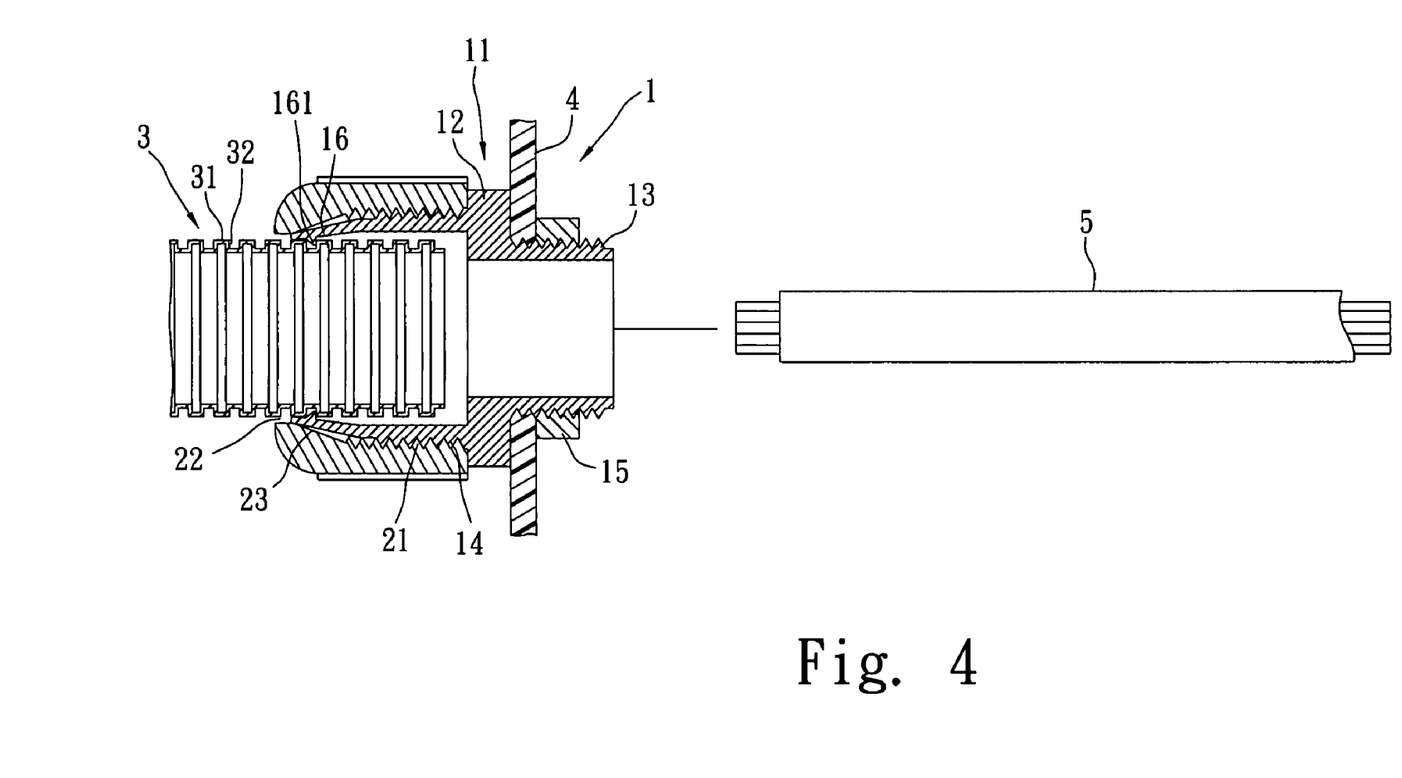
FIGS. 4 and 5 are schematic cross views about the operation of the present invention.
Figure 5:
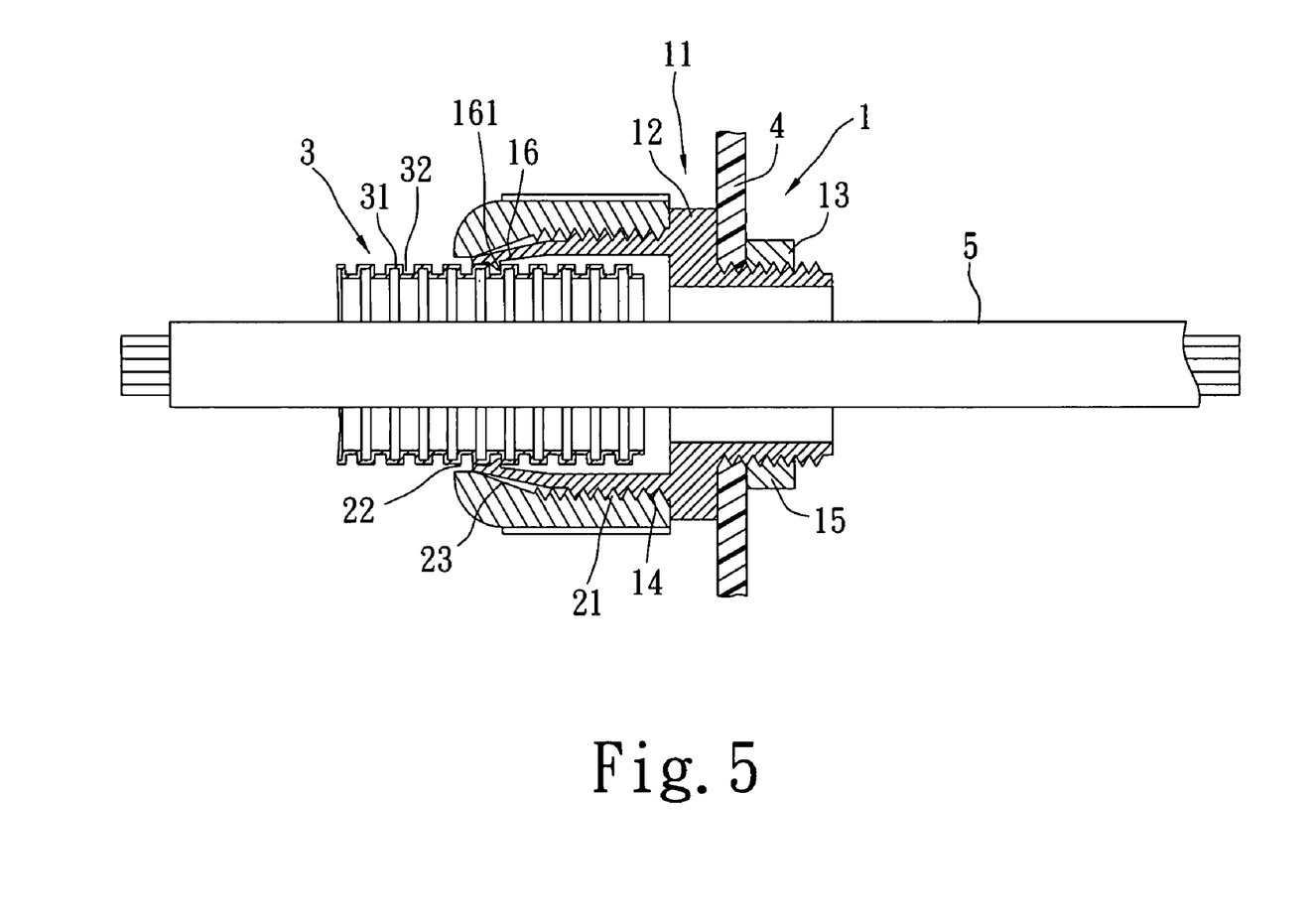
Figure 6:
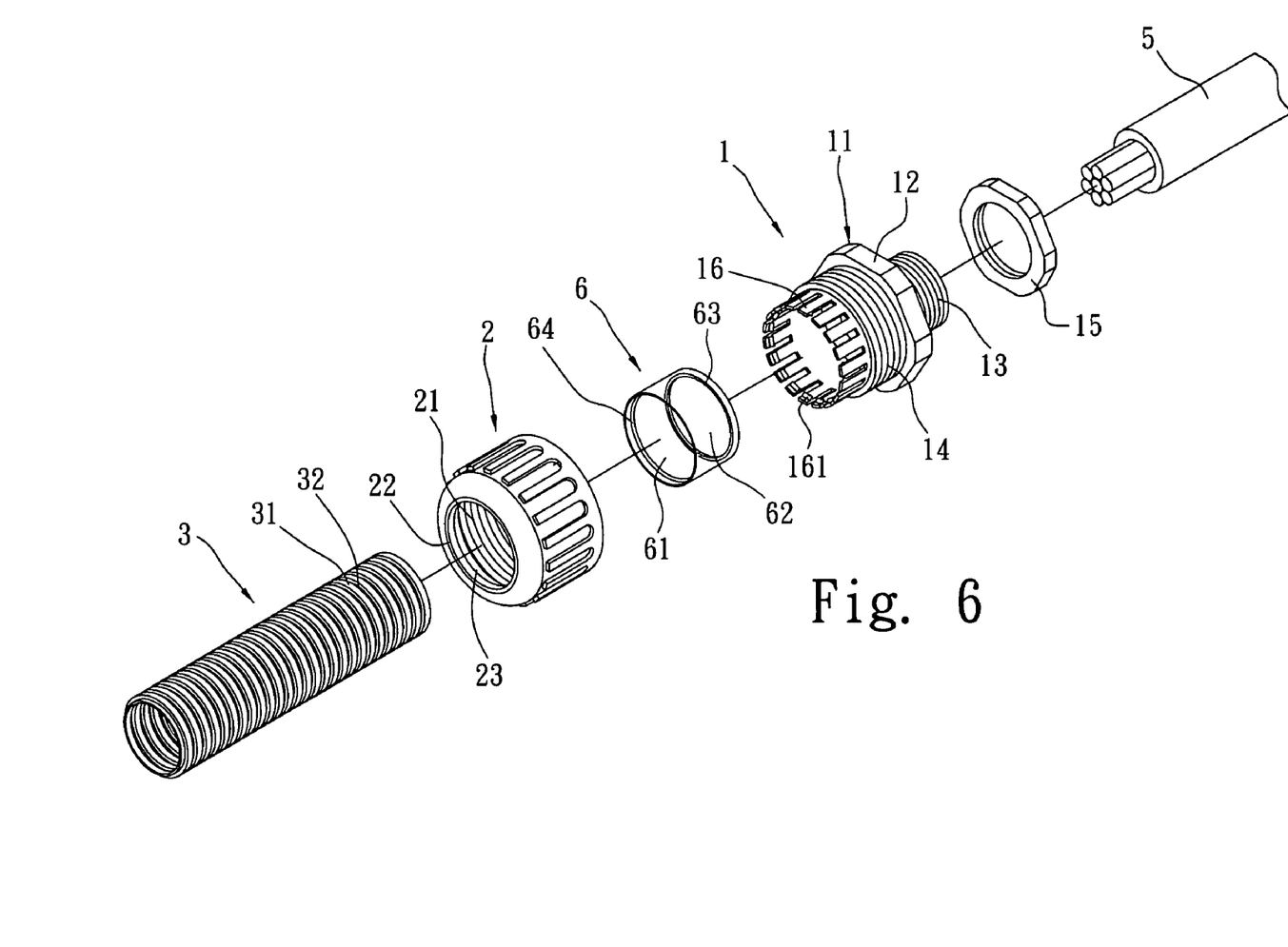
FIG. 6 is an exploded schematic view about another embodiment of the present invention.
Figure 7:
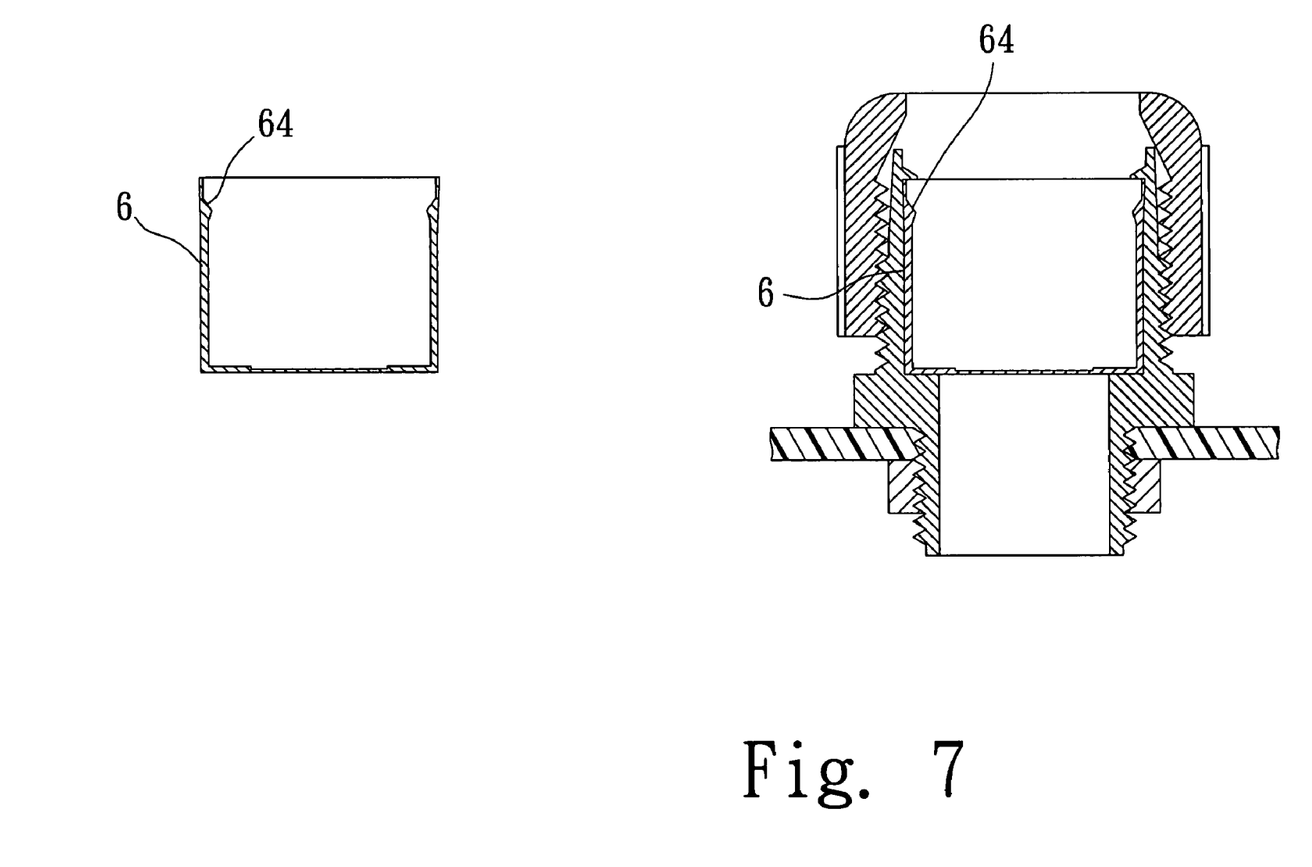
FIG. 7 is a schematic cross view about the assembly of the liner and joint of the present invention.
Figure 8:
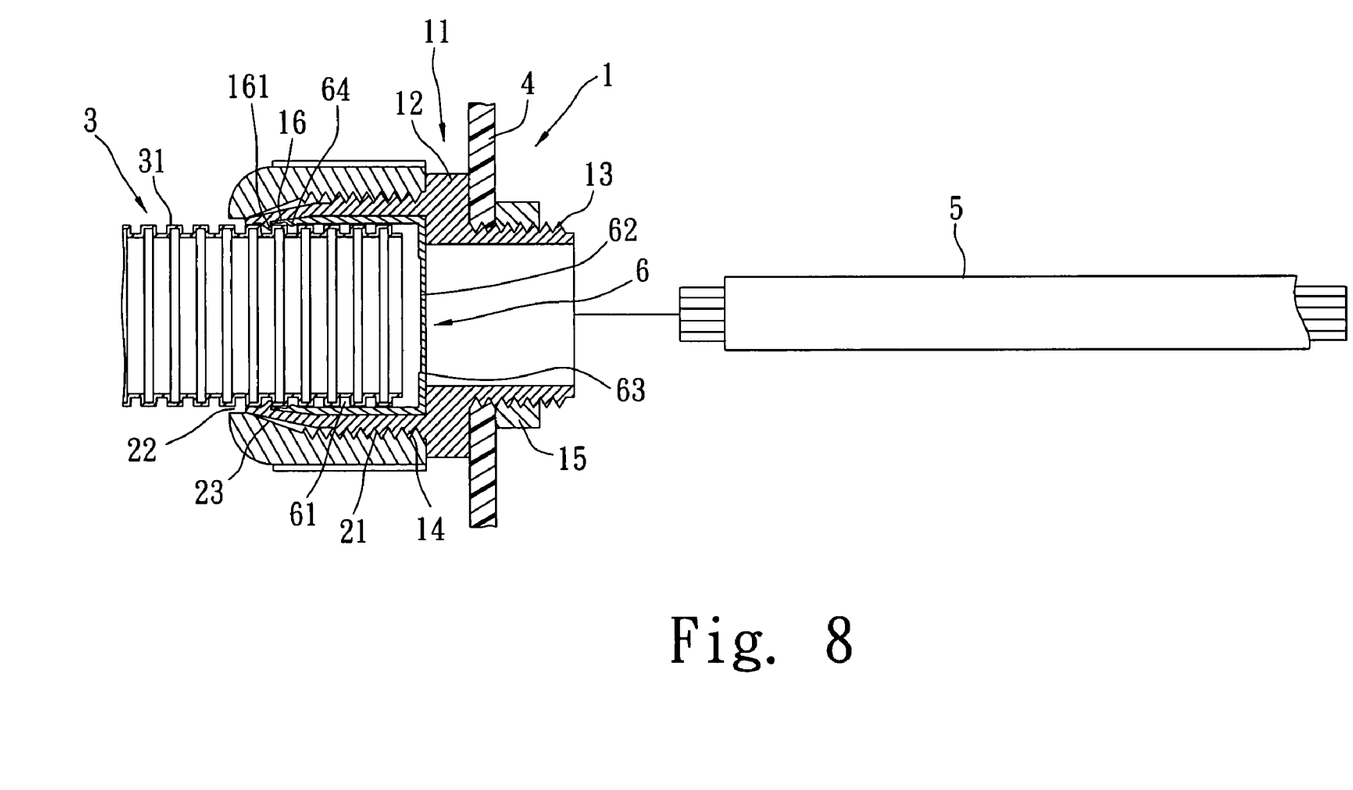
FIGS. 8 and 9 are schematic cross view about another embodiment of the present invention.
Figure 9:
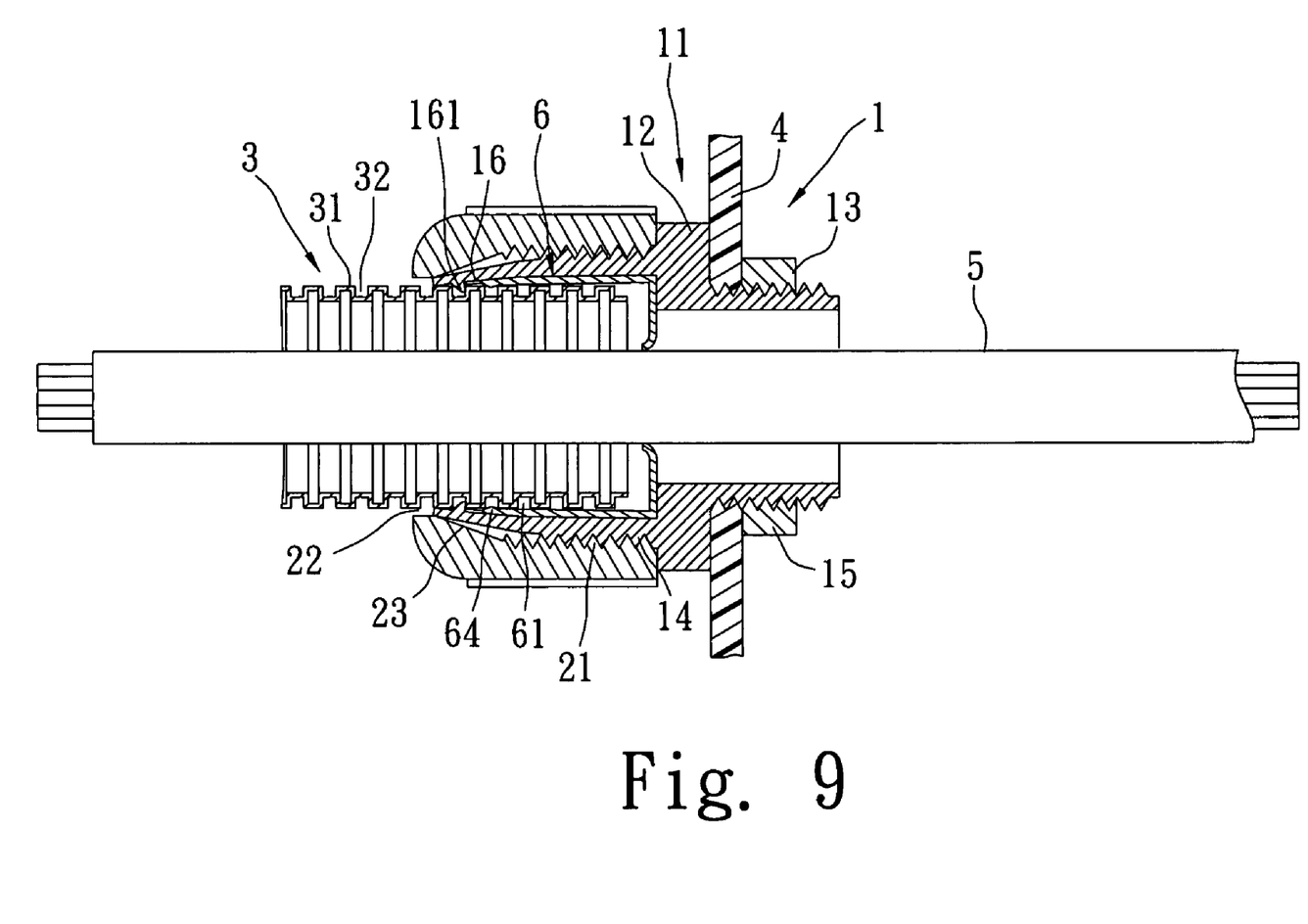

Referring to FIGS. 3 to 5, the assembled of the present invention is illustrated. In operation, the first combining portion 13 of the body 11 of the joint unit 1 passes through the retaining means 4 and then the locking unit 15 is screwed to the first combining portion 13 so as to fix the retaining means 4.

After the body 11 of the joint unit 1 is fixed with the retaining means 4. The tightening element 2 is assembled to the second combining portion 14 of the body 11. At this moment, the tightening element 2 is not tightened (the clamping sheets 16 is not in contact with the extrusion surface 23). The protection tube 3 passes through the through hole 21 of the tightening element 2 so as to be assembled to the body 11 of the joint unit 1. Then the tightening element 2 moves closer to the resisting ring 12 of the body 11 so that the extrusion surface 23 of the tightening element 2 will compress the clamping sheets 16. Thus, the clamping sheets 16 are compressed inwards to be buckled to one recess 32 of the protection tube 3.

After assembling the joint unit 1, tightening element 2 and protection tube 3, a cable 5 is passed through the body 11 of the joint unit 1 to directly enter into the protection tube 3. When an external force is applied to the protection tube 3, the clamping sheets 16 will catch the protection tube 3 effectively so as to avoid the protection tube 3 from losing to protect the protection tube 3 effectively.

Referring to FIGS. 6 to 9, another embodiment of the present invention is illustrated. As illustrated in the drawing, this embodiment is approximately identical to above one. Only the difference of the present embodiment from the previous one is illustrated. An interior of the body has a liner 6 (see FIG. 7) and the liner 6 has an open end 61 and a close end 62 which are sealed by a film made of rubber. When the cable 5 passes through the close end 62 of the liner 6, the rubber of the film will break so that the cable 5 passes therethrough and then is enclosed by the torn close end 6. An interior of the liner 6 has a buckle section 64. The buckle section 64 can be buckled into one recess 32 of the protection tube 3 so as to have the effect of water-proof, dust-proof and insect-proof.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A retaining joint for fixing a cable a joint unit having a hollow body; the hollow body having a resisting ring; a front side and a rear side of the resisting ring having a first combining portion and a second combining portion, respectively; the first combining portion serving for combining with a locking unit; a front end of the second combining portion being connected to a plurality of clamping sheets: the hollow body having a liner with an open end and a closed end; wherein when a first combining portion is screwed with a retaining means, the locking unit serving to screw with the first combining portion; thus the joint unit is locked to the retaining means; a tightening element having a through hole; an inner surface of the tightening element having a thread for combining with the second combining portion; an inner wall of the tightening element being protruded as an extrusion surface for clamping and compress the clamping sheets to clamp a protection tube; and the protection tube being a hollow body; a surface of the protection tube being formed with a plurality of protruding rings and a plurality of recesses for retaining the protection tube; wherein the closed end of the liner is sealed by a film.

2. The retaining joint for fixing a cable as claimed in claim 1, wherein the film is made of rubber.

3. The retaining joint for fixing a cable as claimed in claim 2 wherein an interior of the liner has a buckle section, the buckle section is buckled into one annular recess of the protection tube so as to have the effect of water-proof, dust-proof and insect-proof.

\* \* \* \* \*